US011601945B2

(12) United States Patent
Bachu et al.

(10) Patent No.: US 11,601,945 B2
(45) Date of Patent: Mar. 7, 2023

(54) CONFIGURABLE MAC-PHY API

(71) Applicant: QUALCOMM Incorporated, San Diego, CA (US)

(72) Inventors: Raja Sekhar Bachu, Kendall Park, NJ (US); Rakesh Dugad, Basking Ridge, NJ (US); Prasanna Nadhamuni, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 16/668,822

(22) Filed: Oct. 30, 2019

(65) Prior Publication Data

US 2020/0137745 A1 Apr. 30, 2020

Related U.S. Application Data

(60) Provisional application No. 62/753,862, filed on Oct. 31, 2018.

(51) Int. Cl.
| | |
|---|---|
| *H04W 72/04* | (2009.01) |
| *H04L 69/321* | (2022.01) |
| *H04L 5/00* | (2006.01) |
| *H04L 1/00* | (2006.01) |
| *H04W 72/044* | (2023.01) |
| *H04W 72/0453* | (2023.01) |

(52) U.S. Cl.
CPC ......... *H04W 72/048* (2013.01); *H04L 1/0013* (2013.01); *H04L 5/001* (2013.01); *H04L 69/321* (2013.01); *H04W 72/044* (2013.01); *H04W 72/0453* (2013.01)

(58) Field of Classification Search
CPC .............. H04W 72/048; H04W 72/044; H04L 1/0013; H04L 5/001; H04L 69/321
See application file for complete search history.

(56) References Cited

U.S. PATENT DOCUMENTS

| | | | |
|---|---|---|---|
| 2013/0010716 A1* | 1/2013 | Dinan | H04W 76/15 |
| | | | 370/329 |
| 2016/0314029 A1 | 10/2016 | Gupta et al. | |
| 2017/0367046 A1* | 12/2017 | Papasakellariou | H04L 5/0053 |
| 2019/0075561 A1* | 3/2019 | Tang | H04W 72/0446 |
| 2019/0261298 A1* | 8/2019 | Yoon | H04L 5/0007 |
| 2020/0336249 A1* | 10/2020 | Yi | H04L 5/00 |

FOREIGN PATENT DOCUMENTS

NO 2018063998 A1 4/2018

OTHER PUBLICATIONS

International Search Report and Written Opinion—PCT/US2019/059231—ISA/EPO—dated Feb. 12, 2020.

* cited by examiner

*Primary Examiner* — Benjamin H Elliott, IV
*Assistant Examiner* — Nevena Zecevic Sandhu
(74) *Attorney, Agent, or Firm* — Procopio, Cory, Hargreaves & Savitch LLP

(57) ABSTRACT

The apparatus sends a request from a medium access control (MAC) layer to at least one of a Physical (PHY) Layer or a radio frequency (RF) component using an application protocol interface (API) and receives a response message from the at least one of the PHY layer or the RF component comprising an hierarchical indication of at least one capability of the PHY layer or the RF component using the API. The apparatus may also configure the PHY layer or the RF component based on the at least one capability.

30 Claims, 11 Drawing Sheets

CONFIGURABLE MAC-PHY API

This application claims the benefit of U.S. Provisional Application Ser. No. 62/753,862, entitled "Configurable MAC-PHY API" and filed on Oct. 31, 2018, which is expressly incorporated by reference herein in its entirety.

BACKGROUND

Technical Field

The present disclosure relates generally to communication systems, and more particularly, to an application programming interface (API).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus sends a request from a Medium Access Control (MAC) layer to at least one of a Physical (PHY) Layer or a Radio Frequency (RF) Component using an application protocol interface (API). The apparatus then receives a response message from the at least one of the PHY layer or the RF component comprising an hierarchical indication of at least one capability of the PHY layer or the RF component using the API.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
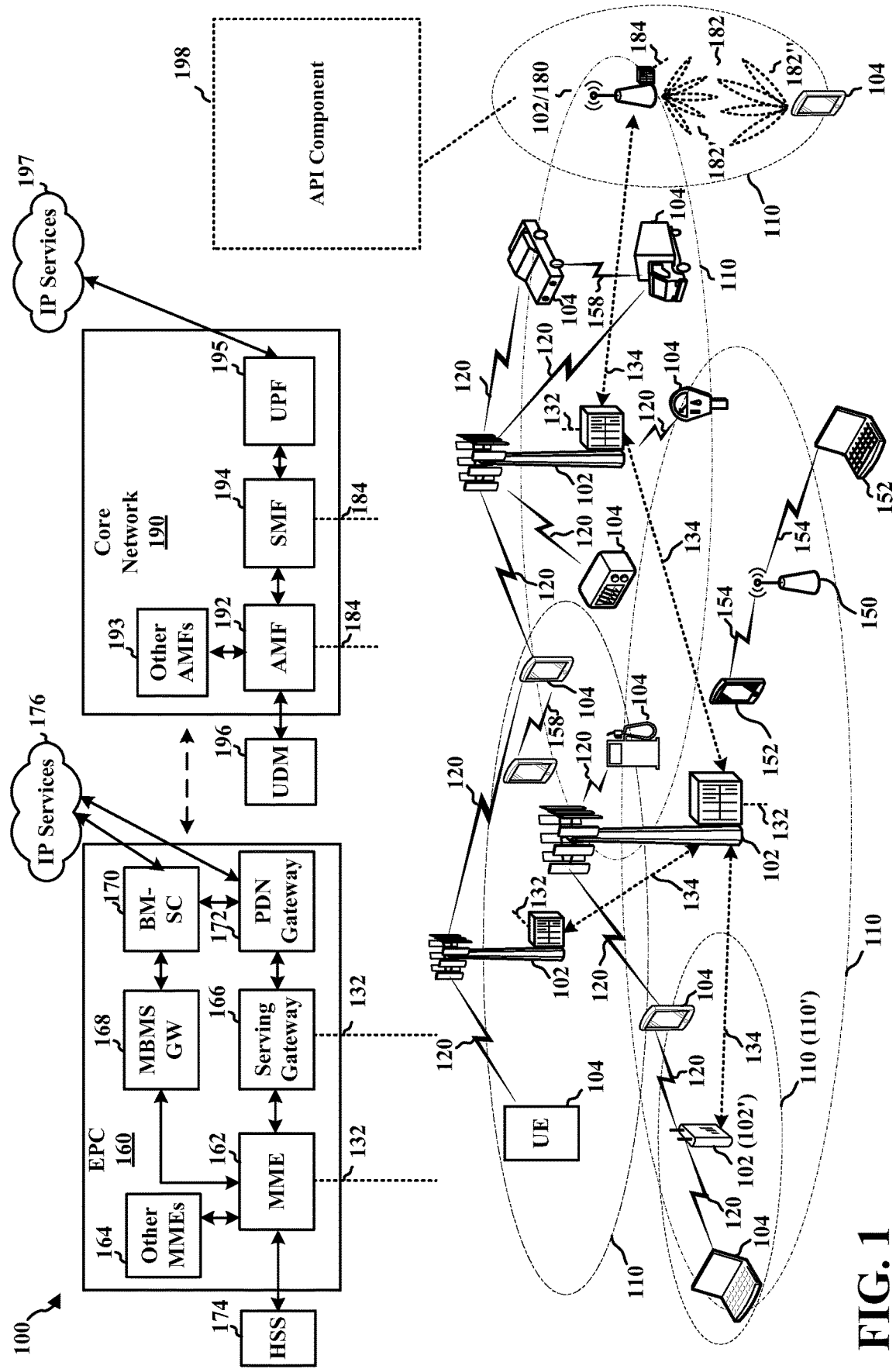
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include an API component (198) configured to send a request from a MAC layer to at least one of a PHY Layer or an RF Component and receive a response message from the at least one of the PHY layer or the RF component indicating at least one capability of the PHY layer or the RF component. The PHY layer or the RF component may be configured based on the capabilities provided in response to the query from the MAC layer. The configuration may include any of a digital beam table configuration, a cell configuration, a physical channel configuration, an analog beam table configuration, among other examples. For example, the PHY layer may respond with capabilities including at least one of a PHY parameter, an RF parameter, a feature set, or a feature set combination. The RF component may provide hierarchical capability information about RF parameters. For example, the RF parameter may include a connectivity matrix, a number of RF ports, a physical antenna configuration, a link budget parameter, or a beam switching rate. The hierarchy of indicated RF parameters may include a set of feature sets for downlink communication per component carrier that are combined into a downlink feature set, a set of feature sets for uplink communication per component carrier that are combined into an uplink feature set. The downlink feature set and the uplink feature set may be combined into a feature set per band. Multiple feature sets per band may be combined into a feature set combination. Although the following description may be focused on 5G NR, the concepts described herein may be applicable to other similar areas, such as LTE, LTE-A, CDMA, GSM, and other wireless technologies.

Figure 2:
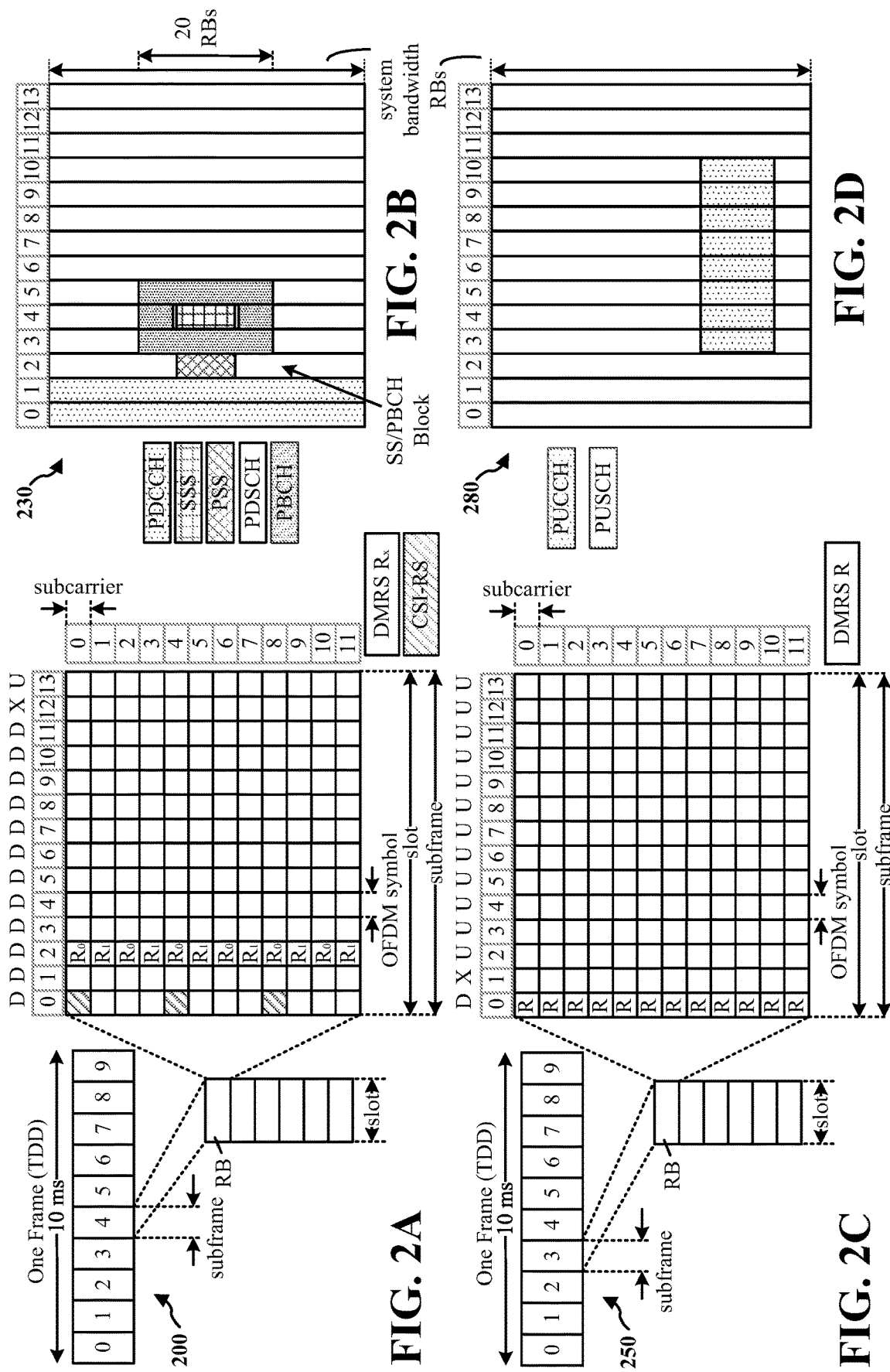
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
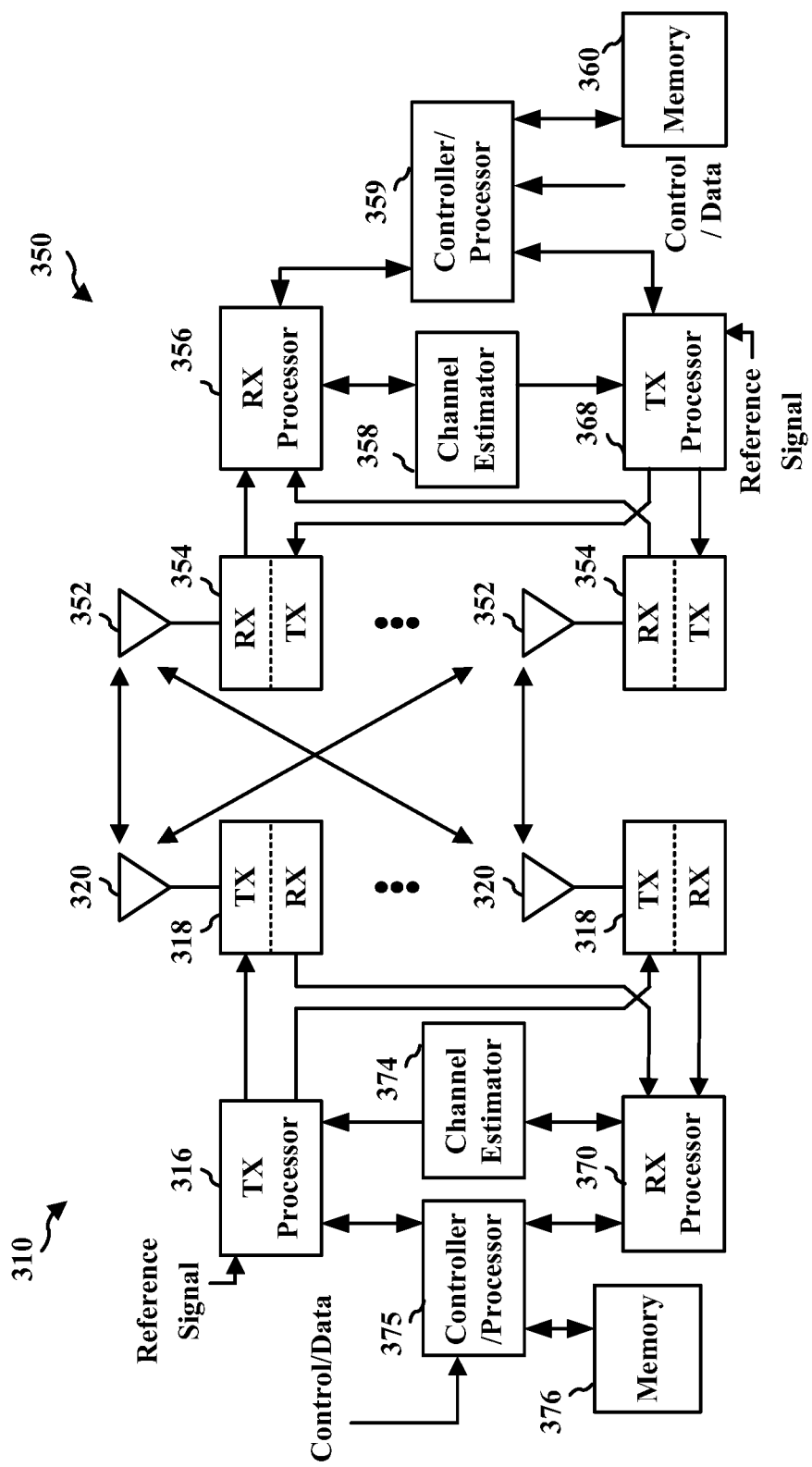
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1 (L1), which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
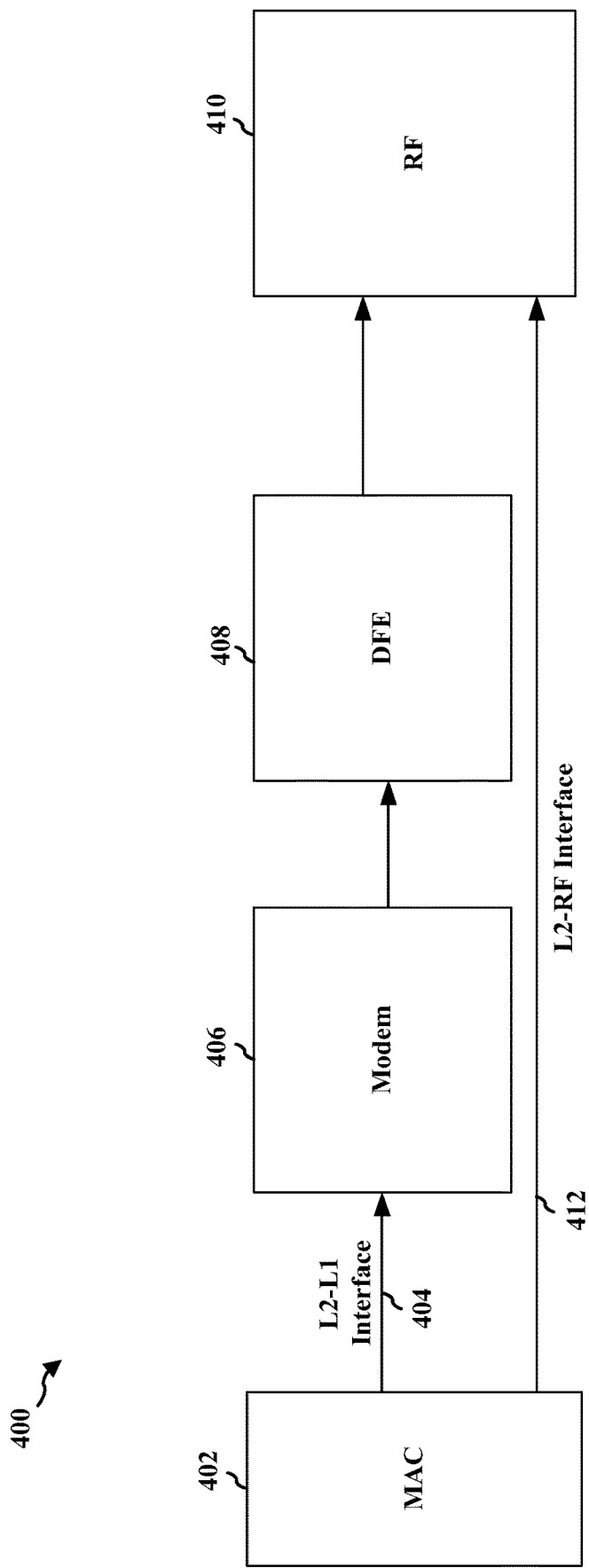
FIG. 4 illustrates example aspects of a base station in accordance with aspects presented herein.

A base station, such as base station 180, may include different layers. For example, the base station may comprise a physical layer may include, e.g., a modem component 406, Digital Front End (DFE) component 408 and Radio Frequency (RF) component 410 as illustrated in FIG. 4. Layer 1 (L1) includes a physical (PHY) layer, and Layer 2 (L2) includes a Medium Access Control (MAC) layer 402. Aspects presented herein present communication between a MAC layer 402 and a PHY layer, e.g., of a base station, that enables the MAC layer to determine the capabilities of the PHY layer. This enables the MAC layer to be aware of the precise capabilities of a particular PHY layer, which would enable MAC implementations that are generic and allow the MAC layer to operate with PHY layers having various different capabilities, e.g., in a plug and play manner. Another potential issue is a lack of clear separation between configuration and dynamic messages. Aspects presented herein may help to reduce look ups in L1, e.g., which may already be known by L2, while avoiding an undesirable increase in the size of the dynamic messages. These aspects may also help to enable forward compatibility, because changes may be implemented in L2 without requiring adjustments to be made to L1. FIG. 4 illustrates that the base station may comprise an L2-L1 interface 404 between the MAC layer 402 and the PHY layer (e.g., modem 406, DFE 408, etc.) and/or an L2-RF interface 412 between the MAC layer 402 and the RF components 410.

As presented herein, an application protocol interface (API) may be provided that exchanges messages or information between L2 and L1 (e.g., between the MAC layer 402 and the PHY layer) and that exchanges messages between the L2 layer and RF components (e.g., between the MAC layer 402 and the RF components 410). The messages may be exchanged in a manner in which, e.g., one transmit message and one receive message may be communicated per slot per numerology (e.g., DL configuration and UL configuration messages per numerology). The header for these messages may include information that is common to the numerology within a carrier, such as a numerology, a carrier index, and baseband waveform generation related parameters. The messages exchanged between the L2 and L1, via the API, may comprise capability messages that inform the MAC layer about capabilities of the PHY layer. The API messages may be encoded, e.g., based on a Little Endian format.

Figure 5:
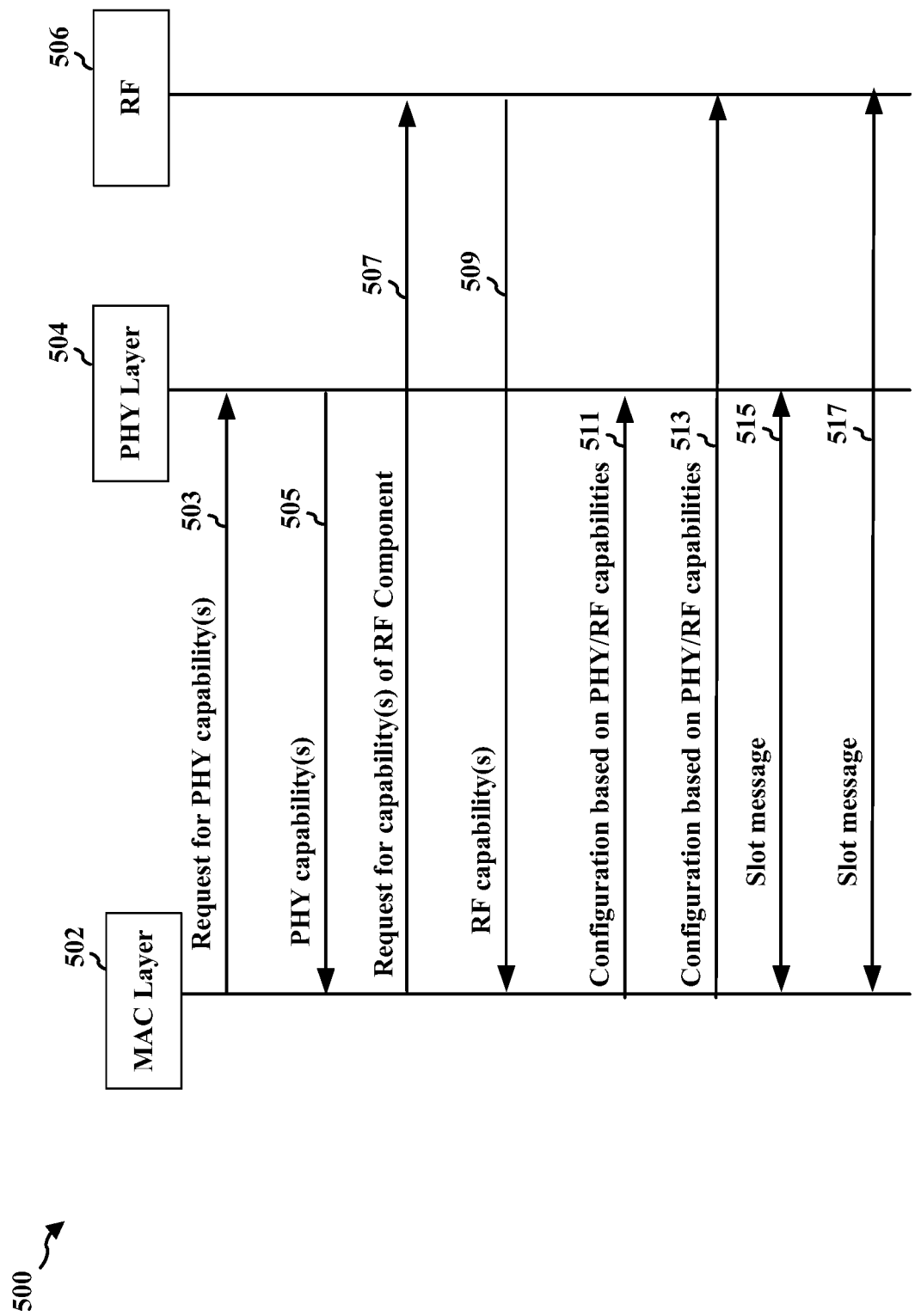
FIG. 5 illustrates an example communication flow between a MAC layer, a PHY layer, and an RF component in accordance with aspects presented herein.

FIG. 5 illustrates an example message exchange between a MAC layer 502 and a PHY layer 504, e.g., based on the API presented herein. FIG. 5 also illustrates an example message exchange between a MAC layer 502 and a RF component 506, e.g., based on the API presented herein. The MAC layer 502 and PHY layer 504 and RF component 506 may correspond to a base station, e.g., base station 102, 180, etc. The MAC layer 502 may send a message 503 to the PHY layer 504 querying for capabilities of the PHY layer 504, e.g., via an API. The PHY layer 504 may respond by sending an indication of at least one capability to the MAC layer 502 in a message 505 via the API. Similarly, the MAC layer 502 may send a message 507 via the API to the RF component 506 querying for capabilities of the RF component 506. The RF component 506 may respond via the API by sending an indication (e.g., message 509) of at least one capability to the MAC layer 502. The indications (e.g., message 505, 509) may be referred to as Transmission Reception Point (TRP) capability messages.

As one example, the PHY layer may indicate at least one HARQ capability of the PHY layer. The HARQ capability(s) may comprise any combination of an amount of time to decode ACK/NACK, an amount of time to prepare PDCCH/PDSCH, an amount of time to decode PUSCH, an amount of time to prepare PDCCH, an amount of time (e.g., K3) between HARQ ACK and DL data, or an amount of time (e.g., K4) between UL data and a subsequent UL grant.

As another example, the PHY layer may indicate at least one physical antenna mapping capability of the PHY layer. The physical antenna mapping capability(s) may comprise, e.g., a transceiver unit (trxu) 0 being mapped to antennas 0-31 and txru 1 being mapped to antennas 32-63.

The TRP capability message(s) may indicate any combination of PHY parameters, RF parameters, feature sets, or feature set combinations.

Table 1 illustrates examples of PHY capabilities, any combination of which may be indicated from the PHY layer 504 to the MAC layer 502 in the TRP capability message 505. For example, a support column may indicate the manner in which a particular PHY layer responds to a capability request message. For example, such capabilities may include any of PHY parameters, RF parameters, information about feature sets for downlink, information about feature sets for downlink per component carrier (CC), information about feature sets for uplink, information about feature sets for uplink per CC, information about feature sets per frequency band, information about feature set combinations, etc.

TABLE 1

Examples of TRP PHY Capability Parameters

| Field | Type |
|---|---|
| | TrpPhyCapability |
| phyParameters | PhyParameters |
| rfParameters | RfParameters |
| nFeatureSetsDownlinkPerCc | Uint16 |
| featureSetsDownlinkPerCc | FeatureSetDownlinkPerCc[nFeatureSetsDownlinkPerCc] |
| nFeatureSetsDownlink | Uint16 |
| featureSetsDownlink | FeatureSetsDownlink[nfeatureSetsDownlink] |
| nFeatureSetsUplinkPerCc | Uint16 |
| featureSetsUplinkPerCc | FeatureSetUplinkPerCc[nFeatureSetsUplinkPerCc] |
| nFeatureSetsUplink | Uint16 |
| featureSetsUplink | FeatureSetsUplink[nFeatureSetsUplink] |
| nFeatureSetPerBand | Uint16 |
| featureSetPerBand | FeatureSetPerBand[nFeatureSetPerBand] |
| nFeatureSetCombinations | Uint16 |
| featureSetCombinations | FeatureSetCombination[nFeatureSetCombinations] |

Table 2 shows examples of potential PHY parameters, any combination of which may be indicated from the PHY layer 504 to the MAC layer 502 in the message 505. As illustrated in Table 2, the PHY parameters may indicate capability information about any of SS or PBCH beams (such as an SS/PBCH burst periodicity, a capability to transmit SS/PBCH on multiple carriers, etc.), a PRACH (such as a PRACH short format, a PRACH long format, a maximum PRACH frequency domain (FD) occasions in a slot, PRACH restricted sets, maximum root sequences, etc.), a PDCCH (such as a maximum amount of PDCCHs per slot, maximum PDCCH aggregation level, a CCE mapping type, a CORESET outside of the first three OFDM symbols of a slot, a precoder granularity CORESET, PDCCH for MUMIMO, etc.), a PUCCH (such as PUCCH formats, etc.), a PDSCH (such as a PDSCH mapping type, PDSCH allocation types, PDSCH virtual resource block (VRB) to physical resource block (PRB) mapping, PDSCH codeblock group (CBG), PDSCH DMRS configuration types, PDSCH DMRS maximum length, PDSCH DMRS additional positions, PDSCH Phase Tracking Reference Signal (PTRS) ports, etc.), a PUSCH (such as UCI multiplexed with uplink shared channel in a PUSCH, PUSCH precoding type, PUSCH frequency hopping, PUSCH DMRS configuration types, PUSCH DMRS maximum length, PUSCH DMRS time division duplex (TDD) orthogonal cover code (OCC), PUSCH DMRS additional positions, PUSCH CBG, PUSCH mapping type, PUSCH allocation types, PUSCH VRB to PRB mapping, PUSCH aggregation factor, a number K of PUSCH repetitions, PUSCH L brm size), a CSI RS, a sounding reference signal (SRS), tracking reference signal (TRS), reserved resource types, and/or number of transceiver units (TRXUs).

TABLE 2

Examples of PHY Parameters

| Field | Type | Description |
|---|---|---|
| PhyParameters ssPbch | | |
| ssPbchMultipleCarriersInABand | Uint8 | {0 - not supported, 1 - supported} |
| multipleCellSsPbchsInACarrier | Uint8 | {0 - not supported, 1 - supported} Corresponds to supporting multiple cells in a single carrier |
| ssPbchDigitalBfTechniques | Uint8 | Bitmap of unit8 0 - No beamforming 1 - Small cyclic delay diversity 2 - Beamforming |
| prach | | |
| prachLongFormats | Uint8 | Bitmap of Uint8 0. 0 1. 1 2. 2 3. 3 |
| prachShortFormats | Uint16 | Bitmap of Uint16 0. A1 1. A2 2. A3 3. B1 4. B2 5. B3 6. B4 7. C0 8. C2 |
| prachRestrictedSets | Uint8 | 0 - not supported 1 - supported 2 - NA |
| prachMultipleCarriersInABand | Uint8 | {0 - not supported, 1 - supported} |
| numberOfPrachSlotsAllowedIna60kHzSlot | Uint8 | Number of PRACH slots allowed within in a 60 kHz slot. |
| nSsPbchsPerRachOccasion | Uint8 | Bitmap of Uint8 0 - ⅛ 1 - ¼ 2 - ½ 3 - 1 4 - 2 5 - 4 6 - 8 7 - 16 |

TABLE 2-continued

Examples of PHY Parameters

| Field | Type | Description |
|---|---|---|
| pdcch | | |
| cceMappingType | {interleaved, non-interleaved} | when mapping type is optional for coresets. interleaved when mandatory (example coreset0) |
| coresetOutsideFirst3OfdmSymsOfSlot | Uint8 | {0 - not supported, 1 - supported} Support for coresets outside the first 3 OFDM symbols in a slot If not supported, SS/PBCH block and control resource set multiplexing patterns 2/3 cannot be supported |
| coresetNonContigFreqDomainAlloc | Uint8 | {0 - not supported, 1 - supported} Support for non-contiguous frequencyDomainResources Non-contiguous frequency domain allocation is optional on the UE side |
| precoderGranularityCoreset | Uint8 | {0 - not supported, 1 - supported} Support for allContiguousRBs precoderGranularity. At UE, this is optional |
| pdcchMuMimo | Uint8 | {0 - not supported, 1 - supported} |
| pdcchPrecoderCycling | Uint8 | {0 - not supported, 1 - supported} Support for precoder cycling method of beamforming |
| maxPdcchPrecoderCycleLength | Uint8 | |
| pucch | | |
| pucchFormats | Uint8 | Bitmap of Uint8 0 - Format 0 1 - Format 1 2 - Format 2 3 - Format 3 4 - Format 4 |
| pucchIntraslotFreqHopping | Uint8 | Bitmap of Uint8 0 - Format 0 1 - Format 1 2 - Format 2 3 - Format 3 4 - Format 4 |
| pucchInterslotFreqHopping | Uint8 | Bitmap of Uint8 0 - Format 0 1 - Format 1 2 - Format 2 3 - Format 3 4 - Format 4 |
| twoSybmolShortFormat | Uint8 | Bitmap of Uint8 0 - Format 0 1 - Format 2 |
| pucchGroupHopping | Uint8 | 0: GROUP_HOPPING_NEITHER 1: GROUP_HOPPING_ENABLED 2: GROUP_HOPPING_DISABLED |
| pucchNrofSlots | Uint8 | Bitmap of Uint8 Corresponding bit indicates which of 1, 2, 4, 8 are supported |
| pucchMultiplexingUe | Uint8 | Bitmap of Uint8 0 - Format 0 1 - Format 1 2 - Format 2 3 - Format 3 4 - Format 4 |
| additionalDmrs | Uint8 | Bitmap of Uint8 0 - Format 3 1 - Format 4 |
| pi2Bpsk | Uint8 | Bitmap of Uint8 0 - Format 3 1 - Format 4 |

TABLE 2-continued

Examples of PHY Parameters

| Field | Type | Description |
|---|---|---|
| pdsch | | |
| pdschMappingTypes | Uint8 | Bitmap of Uint8 {0 - typeA, 1 - typeB} |
| pdschAllocationTypes | Uint8 | Bitmap of Uint8 {0 - type0, 1 - type1} |
| pdschMuMimoOverlap | Uint8 | {0 - full overlap, 1 - partial overlap} |
| pdschVrbToPrbMapping | Uint8 | Bitmap of Uint8 {0 - non-interleaved, 1 - interleaved} |
| pdschAggregationFactor | Uint8 | Bitmap of Uint8 Corresponding bit indicates which of 1, 2, 4, 8 are supported |
| pdschCbg | Uint8 | {0 - not supported, 1 - supported} |
| pdschDmrsConfigTypes | Uint8 | Bitmap of Uint8 0 - type 1 1 - type 2 |
| pdschDmrsMaxLength | Uint8 | {1, 2} |
| pdschDmrsAdditionalPos | Uint8 | bitmap of Uint8 bit0: pos0 (1 + 0) bit1: pos1 (1 + 1) bit2: pos2(1 + 1 + 1) bit3: pos3(1 + 1 + 1 + 1) This is applicable to the non-fallback operation. For fallback operation, pos2 may be mandatory |
| pdschDataInDmrsSymbols | Uint8 | {0 - not supported, 1 - supported} |
| preemptionSupport | Uint8 | {0 - not supported, 1 - supported} |
| pdschNonSlotSupport | Uint8 | {0 - not supported, 1 - supported} |
| pdschPrecoderCycling | Uint8 | {0 - not supported, 1 - supported} Support for precoder cycling method of beamforming |
| maxPdschPrecoderCycleLength | Uint8 | |
| pusch | | |
| uciMuxUlschInPusch | Uint8 | {0 - not supported, 1 - supported} |
| uciOnlyPusch | Uint8 | {0 - not supported, 1 - supported} |
| harqAckNackInUciOnPusch | Uint8 | {0 - not supported, 1 - supported} |
| puschPrecodingType | Uint8 | Bitmap of Uint8 {0 - non-codebook based, 1 - codebook based} |
| puschFrequencyHopping | Uint8 | {0 - not supported, 1 - supported} |
| puschDmrsConfigTypes | Uint8 | Bitmap of Uint8 0 - Config Type 1 1 - Config Type 2 |
| puschDmrsMaxLen | Uint8 | 1, 2 |
| puschDmrsAdditionalPos | Uint8 | bitmap of Uint8 bit0: pos0 (1 + 0) bit1: pos1 (1 + 1) bit2: pos2(1 + 1 + 1) bit3: pos3(1 + 1 + 1 + 1) This is applicable to the non-fallback operation. For fallback operation, pos2 may be mandatory |
| puschDataInDmrsSymbols | Uint8 | {0 - not supported, 1 - supported} |
| puschCbg | Uint8 | {0 - not supported, 1 - supported} |
| puschMappingTypes | Uint8 | Bitmap of Uint8 {0 - typeA, 1 - typeB} |
| puschAllocationTypes | Uint8 | Bitmap of Uint8 {0 - type0, 1 - type1} |
| puschMuMimoOverlap | Uint8 | {0 - full overlap, 1 - partial overlap} |
| puschVrbToPrbMapping | Uint8 | Bitmap of Uint8 {0 - non-interleaved, 1 - interleaved} |
| puschAggregationFactor | Uint8 | Bitmap of Uint8 Corresponding bit indicates which of 1, 2, 4, 8 are supported |
| puschLbrm | Uint8 | {0 - not supported, 1 - supported} |
| puschMaxPtrsPorts | Uint8 | {0, 1, 2} Max uplink PTRS ports supported per UE. 0 implies PTRS not supported |
| cdmDmrsPortsOfMuMimoUsers | Uint8 | {0 - not supported, 1 - supported} |
| puschNonSlotSupport | Uint8 | {0 - not supported, 1 - supported} |

TABLE 2-continued

Examples of PHY Parameters

| Field | Type | Description |
|---|---|---|
| | | srs |
| srsSupport | Uint8 | {0 - not supported, 1 - supported} SRS support |
| freqHoppingSupport | Uint8 | {0 - not supported, 1 - supported} Frequency hopping support |
| groupHoppingSupport | Uint8 | {0 - not supported, 1 - supported} Group hopping support |
| sequenceHoppingSupport | Uint8 | {0 - not supported, 1 - supported} Sequence hopping support |
| | | misc |
| reservedResourceTypes | Uint8 | Bitmap of Uint8 9. LTE CRS 10. Coreset 11. bitmap12 |
| cp | Uint8 | Bitmap of Uint8 0 - normal 1 - extended |
| ssPbchRmsiMuxPatterns | Uint8 | Bitmap of Uint8 0 - pattern1 1 - pattern2 2 - pattern3 |
| sulSupport | Uint8 | {0 - not supported, 1 - supported} |
| supportedUserMuxSchemesInSlot | Uint8 | Bitmap of Uint8 0 - spatial 1 - frequency 2 - time |
| dynamicSlotFormatSupport | Uint8 | {0 - not supported, 1 - supported} |
| maxDigBfTableEntries | Uint16 | Implies that the digital beamforming indices cannot take a value greater than this |

Figure 6:
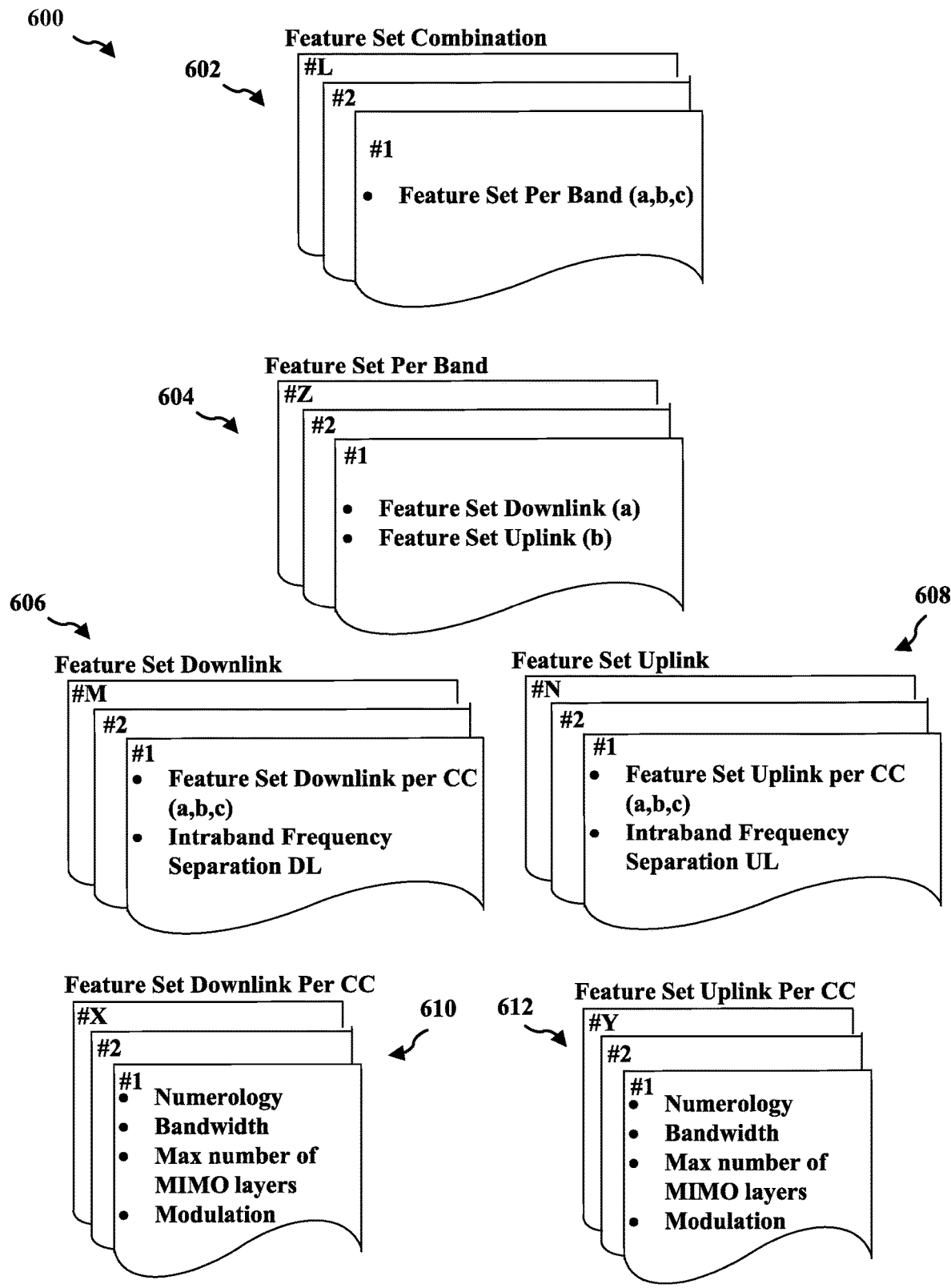
FIG. 6 illustrates an example RF hierarchy in accordance with aspects presented herein.

There may be an hierarchy of RF parameters. FIG. 6 illustrates an example hierarchy 600 of RF parameters. RF parameters may be applicable to both baseband and RF. RF only capabilities may be indicated in an RF capability message, e.g., 509. Table 3 illustrates examples of RF parameters, any combination of which may be indicated to the MAC layer 502, e.g., in a TRP message 509. For example, the RF parameters may include a list of supported bands for NR, a list of supported band combinations, etc.

TABLE 3

Example TRP PHY Capabilities

| Field | Type | Description |
|---|---|---|
| | RfParameters | |
| nBandCombinations | Uint16 | |
| supportedBandCombinationList | BandCombination [nBandCombinations] | A list of band combinations that the TRP supports for NR |

Table 4 illustrates examples of band combination information that may be indicated to the MAC layer 502. For example, the band combination information may include any of a band list, a feature set combination identifier (ID), and/or a supported bandwidth for the combination set, etc.

TABLE 4

Example Band Combinations

| Field | Type | Description | Example |
|---|---|---|---|
| | | BandCombination | |
| nBands | Uint8 | Maximum of maxSimultaneousBands = 32 | 1 |
| bandList | Uint16 [nBands] | 1-1024 | 257 |
| featureSetCombinationId | Uint16 | 0-1023. This ID refers to the position of a specific FeatureSetCombination entry featureSetCombinations list in TrpPhyCapability. | 0 |

FIG. 6 illustrates an hierarchy 600 in which RF capabilities may be indicated to the MAC layer, such as described in connection with FIG. 5. As illustrated in FIG. 6, there may be a plurality of feature set combinations 602, e.g., feature set combination #1, feature set combination #2, . . . , feature set combination #L. Each feature set combination may comprise a combination of multiple feature sets per band 604. For example, feature set #1 is illustrated as comprising feature set per band a, feature set per band b, and feature set per band c. Table 5 illustrates examples fields of feature set combinations, e.g., that may be indicated to the MAC layer 502 in message 505, 509. For example, such fields may include a feature set combination ID, a feature set per band ID, etc.

TABLE 5

Examples for Feature Set Combinations

| Field | Type | Description | Ex. |
|---|---|---|---|
| FeatureSetCombination | | | |
| nBands | Uint8 | | |
| featureSetPerBandIds | Uint8 [nBands] | Range 0-127 | 0 |
| ssPbch | | | |
| maxSsbsPerCarrierPerCellInBurst | Uint8 | Maximum number of SS-PBCH blocks in a burst | 16 |
| minSsPbchBurstPeriodicity | Uint8 | Minimum SS-PBCH burst periodicity | 20 ms |
| maxSsPbchBlocksPerSlot | Uint8 | Maximum number of SS-PBCH blocks across cells and carriers | [4] |
| Prach | | | |
| maxPrachFdOccasionsInASlot | Uint8 | Maximum number of FD occasions in a RACH slot across carriers and cells. | [2] |
| maxPrachFdOccasionsInASlotPerCarrier | Uint8 | Maximum number of FD occasions in a RACH slot per carrier | [1] |
| maxRootSequencesPerSlotPerFd | Uint8 | Maximum root sequences supported per FD occasion in a slot. Note: if the number of TD occasions per FD occasion within a slot is > 1, then maxRootSequencesPerSlotPerFd roots can be supported per TD occasion. | [16] |
| supportedSubcarrierSpacingsPrachShort | Uint8 | Bitmap of Uint8 0-15 kHz 1-30 kHz 2-60 kHz 3-120 kHz | 1000 |
| supportedSubcarrierSpacingsPrachLong | Uint8 | Bitmap of Uint8 0-1.25 kHz 1-5 kHz | 00 |
| N5 | Uint8[4] | One per numerology. NA for numerologies not supported. Time to demodulate PRACH (worst case) from the end of PRACH transmission in the last TD occasion within a PRACH slot expressed in symbols (of the corresponding numerology). | |
| Pdcch | | | |
| maxPdcchsPerSlot | Uint8 | | 16 |
| pucch | | | |
| pucchUciMaxK | Uint16 | | 244 |
| pucchUciMaxN | Uint16 | | 512 |
| pucchUciMaxE | Uint16 | | [1023] |
| maxPucchsPerSlot | Uint8[5] | Max number of Pucch per format | [00808] |
| P2 | Uint8[5] | Minimum time between reception of PucchCmd and the target OTA slot in symbols (of the corresponding numerology) | |
| pdsch | | | |
| maxPdschHarqProcesses | Uint8 | | 10 |
| maxPdschTransportBlocks | Uint8 | Maximum number of PDSCH transport blocks in slot | 16 |
| N31 | Uint8[4] | One per numerology. NA for numerologies not supported. Time to decode ACK/NACK (over | |

TABLE 5-continued

Examples for Feature Set Combinations

| Field | Type | Description | Ex. |
|---|---|---|---|
| N32 | Uint8[4] | PUCCH or PUSCH) in symbols (of the corresponding numerology) One per numerology. NA for numerologies not supported. Time to prepare PDCCH/PDSCH in symbols (of the corresponding numerology) | |
| K3 | Uint8[4] | One per numerology. NA for numerologies not supported. Minimum number of slots between reception of ACK/NACK in the uplink and (re-)transmission of PDCCH/PDSCH | |
| pusch | | | |
| maxPuschHarqProcesses | Uint8 | | 8 |
| maxPuschTransportBlocks | Uint8 | Maximum number of PUSCH transport blocks in a slot | 8 |
| maxUciOnlyPuschs | Uint8 | Maximum of PUSCHs with only UCI in a slot | 2 |
| puschUciMaxK | Uint16 | | 244 |
| puschUciMaxN | Uint16 | | 512 |
| puschUciMaxE | Uint16 | | [1023] |
| N41 | Uint8[4] | One per numerology. NA for numerologies not supported. Time to decode PUSCH in symbols (of the corresponding numerology) | |
| N42 | Uint8[4] | One per numerology. NA for numerologies not supported. Time to prepare PDCCH in symbols (of the corresponding numerology) | |
| P1 | Uint8[4] | Minimum time between reception of PuschCmd and the target OTA slot in symbols (of the corresponding numerology) | |
| K4 | Uint8[4] | One per numerology. NA for numerologies not supported. Minimum number of slots between reception of PUSCH and transmission of uplink grant for (re-)transmission | |
| maxDurationWithinReTxInSlots | Uint8 | Max number of slots after a (re)transmission, within which a re-transmission can happen. If re-transmission does not happen within this duration, the HARQ buffer is reset and scheduling may proceed within this understanding | 8 |
| csiRs | | | |
| maxNumPortsCsirsTxPerSymbol | Uint8 | {0, 1, 2, . . . , 255} Maximum number of ports for NZP-CSI-RS transmissions per symbol | 2 |
| maxNumAggrPortsCsirsTxPerSlot | Uint8 | {0, 1, 2, . . . , 255} Maximum number of aggregated ports for NZP- CSI-RS transmissions per slot across carriers. For example, L1 can transmit 2 port NZP-CSI-RS (FD-CDM2) signals in up to 4 symbols within a slot. | 8 |
| srs | | | |
| maxNumPortsPerUe | Uint8 | {0-1, 1-2, 2-4} Maximum number of SRS ports supported per UE in a slot | 0 |
| maxNumSymbolsPerUe | Uint8 | {0-1, 1-2, 2-4} Maximum number of SRS symbols supported per UE in a slot | 0 |
| maxNumRepetitionsPerUe | Uint8 | {0-1, 1-2, 2-4} Maximum number of SRS repetitions supported per UE in a slot | 0 |

TABLE 5-continued

Examples for Feature Set Combinations

| Field | Type | Description | Ex. |
|---|---|---|---|
| maxNumAggrPortsPerUe | Uint8 | {1, 2, 3, . . . , 255} Maximum number of aggregated SRS ports supported per UE in a slot | 1 |
| maxNumAggrPortsPerSlot | Uint8 | {1, 2, 3, . . . , 255} Maximum number of aggregated SRS ports supported across UEs per slot across carriers. For example, L1 can receive 1 port SRS signal from up to 4 UEs within a slot. | 4 |
| misc | | | |
| dlUsersPerSlot | Uint8 | | 2 |
| ulUsersPerSlot | Uint8 | | 2 |

As illustrated in FIG. 6, each feature set per band 604 may comprise a combination of feature sets for downlink 606 and feature sets for uplink 608. FIG. 6 illustrates Feature set per band #1 as comprising a feature set for downlink a and a feature set for uplink. Table 6 illustrates example fields of a feature set per band, e.g., that may be indicated to the MAC layer 502 in message 505, 509. For example, the feature set per band may indicate a feature set per band ID, a feature set downlink ID, a feature set uplink ID, etc.

TABLE 6

Examples for Feature Set Per Band

| Field | Type | Description | Example |
|---|---|---|---|
| | FeatureSetPerBand | | |
| featureSetDownlinkId | Uint16 | 0-1023 | 0 |
| featureSetUplinkId | Uint16 | 0-1023 | 0 |
| nTrxus | Uint8 | | 2 |

As illustrated in FIG. 6, each feature set for downlink 606 may comprise multiple feature sets for downlink per component carrier (CC) 610 and each feature set for uplink 608 may comprise multiple feature sets for uplink per CC 612. Tables 7 and 8 illustrate example fields of feature sets for uplink 608 and feature sets for downlink feature 606, e.g., that may be indicated to the MAC layer 502 in message 505, 509. For example, the feature set for downlink capability may indicate a feature set downlink ID, a feature set downlink per CC ID, an intra-band frequency separation for downlink, a maximum total bandwidth for downlink, etc. The feature set for uplink capability may indicate a feature set uplink ID, a feature set uplink per CC ID, an intra-band frequency separation for uplink, a maximum total bandwidth for uplink, etc.

TABLE 7

Examples for Feature Set for Downlink

| Field | Type | Description | Example |
|---|---|---|---|
| | FeatureSetDownlink | | |
| nCcs | Uint8 | 1-32. Number of component carriers for this template | 8 |
| featureSetDownlinkPerCcIds | Uint16[nCcs] | Up to 32 carriers. Range of 0-1023 | (0, 0, 0, 0, 0, 0, 0, 0) |
| intraBandFreqSeparationDl | Uint16 | Frequency separation in MHz | 1200 MHz |
| maxTotalBw | Uint16 | Bandwidth in MHz | 800 MHz |

TABLE 8

Examples for Feature Set for Uplink

| Field | Type | Description | Example |
|---|---|---|---|
| | FeatureSetUplink | | |
| nCcs | Uint8 | 1-32. Number of component carriers for this template | 8 |
| featureSetUplinkCcIds | Uint16 [nCcs] | Up to 32 carriers. Range of 0-1023 | (0, 0, 0, 0, 0, 0, 0, 0) |
| intraBandFreqSeparationUl | Uint16 | Frequency separation in MHz | 1200 MHz |
| maxTotalBw | Uint16 | Bandwidth in MHz | 800 MHz |

As illustrated in FIG. 6, each feature set for downlink per CC 610 may comprise aspects relating to numerology, bandwidth, a maximum number of MIMO layers, modulation, etc. for downlink transmission per CC. Similarly, each feature set for uplink per CC 612 may comprise aspects relating to numerology, bandwidth, a maximum number of MIMO layers, modulation, etc. for uplink reception per CC. Tables 9 and 10 illustrate example fields of feature sets for uplink and downlink feature sets per CC, e.g., that may be indicated to the MAC layer 502 in message 505, 509. For example, the capability for the downlink feature sets per CC may indicate a feature set downlink per CC ID, a supported subcarrier spacing for downlink, a supported bandwidth for downlink, a number of MIMO layers for PDSCH, a supported modulation order for downlink, a number of MUMIMO users for downlink, etc. For example, the capability for the uplink feature sets per CC may indicate a feature set uplink per CC ID, supported subcarrier spacings for uplink, a supported bandwidth for uplink, a number of MIMO layers for non-codebook PUSCH, supported modulation order for uplink, discrete fourier transform spread orthogonal frequency division multiplex (DFTS OFDM), a maximum number of MUMIMO users for uplink, etc.

TABLE 9

Examples for Feature Set for Downlink per CC

| Field | Type | Description | Example |
|---|---|---|---|
| | FeatureSetDownlinkPerCc | | |
| supportedSubcarrierSpacingsDl | Uint8 | Bitmap of Uint8<br>0-15 kHz<br>1-30 kHz<br>2-60 kHz<br>3-120 kHz<br>4-240 kHz<br>This may be applicable to all downlink PHY channels (for which the corresponding subcarrier spacing is supported) | 1000 |
| supportedBandwidthDl | Uint16 | Bitmap of Uint16<br>0-5 MHz,<br>1-10 MHz,<br>2-15 MHz,<br>3-20 MHz,<br>4-25 MHz,<br>5-40 MHz,<br>6-50 MHz,<br>7-60 MHz,<br>8-70 MHz,<br>9-80 MHz,<br>10-90 MHz,<br>11-100 MHz,<br>12-200 MHz,<br>13-400 MHz | 100 MHz |
| maxNumberMimoLayersPdsch | Uint8 | | 2 |
| supportedModulationOrderDl | Uint8 | 0 - QPSK<br>1-16 QAM<br>2-64 QAM<br>3-256 QAM | 64 QAM |
| maxMuMimoUsersDl | Uint8 | | 2 |

TABLE 10

Examples for Feature Set for Uplink per CC

| Field | Type | Description | Example |
|---|---|---|---|
| | FeatureSetUplinkPerCc | | |
| supportedSubcarrierSpacingsUl | Uint8 | Bitmap of Uint8<br>0-15 kHz<br>1-30 kHz<br>2-60 kHz<br>3-120 kHz<br>This may be applicable to all uplink PHY channels except PRACH (for which the corresponding subcarrier spacing is supported) | 1000 |
| supportedBandwidthUl | Uint16 | Bitmap of Uint16<br>0-5 MHz,<br>1-10 MHz,<br>2-15 MHz,<br>3-20 MHz,<br>4-25 MHz,<br>5-40 MHz,<br>6-50 MHz,<br>7-60 MHz,<br>8-70 MHz,<br>9-80 MHz,<br>10-90 MHz,<br>11-100 MHz,<br>12-200 MHz,<br>13-400 MHz | 100 MHz |
| maxNumberMimoLayersNonCbPusch | Uint8 | | 1 |
| supportedModulationOrderUl | Uint8 | 0-QPSK<br>1-16 QAM<br>2-64 QAM<br>3-256 QAM | 64 QAM |

TABLE 10-continued

Examples for Feature Set for Uplink per CC

| Field | Type FeatureSetUplinkPerCc | Description | Example |
|---|---|---|---|
| dftsOfmSupport | Uint8 | {0 - not supported, 1 - supported} | |
| maxMuMimoUsersUl | Uint8 | | 1 |

Configuration messages may be sent based on the indicated capabilities. For example, the MAC layer may configure a PHY layer and/or an RF component for communication with UE(s) based on the indicated capabilities.

Configuration messages between a base station and UE can also be used for re-configuration while the PHY is running, especially messages that are sent over RRC to the UE for different configurations. If the PHY implementation does not support a particular configuration at runtime, the configuration may be rejected and an error message may be sent back indicating the reason for rejection.

A configuration message may comprise a beam table. The beam table may be a superset of precoding matrices, e.g., up to a dimension supported by the implementation.

A configuration message may comprise a cell configuration, such as a physical cell ID that may correspond to $N_{ID}^{Cell}$ and that may be used for PSS/SSS generation and DMRS location in frequency.

A configuration message, e.g., 511, may comprise a physical channel configuration, e.g., for a PRACH. For example, such information about PRACH configuration may include any of a PRACH sequence length, a total number of random access preambles, a number of PRACH frequency occasions, a PRACH root sequence index, a subcarrier spacing for PRACH, information about a restricted set, frequency offset information, information about unused root sequences, etc.

Slot messages may be sent between the MAC layer and the PHY layer, e.g., in either direction, e.g., slot message 515. The slot messages may be consistent with the last received configuration message (e.g., all configuration messages may be consistent with the capabilities received from PHY/RF). The slot messages may be per numerology. For example, a header for a slot message may include any of a carrier ID for an uplink/downlink pair, a numerology, a system frame number (SFN), a slot number, etc.

A slot message may comprise information about bandwidth part (BWP). Although bandwidth part may be a UE specific or a UE group specific concept, it may be used in the API to address specific RBs using indirection (specific bandwidth part and RBs within the bandwidth part). For example, the slot message may indicate any of a frequency domain location for the BWP, a bandwidth for the BWP, a subcarrier spacing for the BWP, a cyclic prefix for the BWP, etc.

A slot message may comprise information about access, e.g., a synchronization signal-physical broadcast channel (SS-PBCH) transmission. For example, the slot message may indicate information about any of a PSS power, an SSB index, a broadcast channel payload, information about $k_{SSB}$, information about the SSB common resource block (CRB), information about a digital beamforming method, a digital beamforming cyclic delay, a beam index, etc.

The slot message may comprise information for a physical channel configuration, e.g., PRACH. For example, for a PRACH command, the message may indicate any of a PRACH format, a number of time occasions within a PRACH slot, a frequency domain occasion, a PRACH start symbol, beamforming information, etc. For example, for a PRACH L1 report per frequency domain/time domain occasion, the message may indicate any of a number of detected preambles, information about detected preambles, a time domain occasion for the PRACH, a frequency domain occasion for the PRACH, timing estimate information, an average value or RSSI, and average value of SNR, etc.

A slot message may comprise downlink data information, e.g., such as at least one of downlink control transmission information, data transmission information, or uplink control reception information. For example, for a CORESET command, the message may indicate any of a bandwidth part, frequency domain resources, a starting symbol for the CORESET, a time duration for the CORESET, the number of REGs in a bundle, information about a CCE to REG mapping (such as indicating interleaved or non-interleaved), an interleaver size, a shift index indicating a number of PRBs, a precoder granularity, an identifier about scrambling before modulation or DMRS sequence generation, a DMRS subcarrier 0 reference, a number of PDCCHs in a CORESET, or other PDCCH information. For PDCCH information, the message may indicate information about any of an RNTI used for scrambling during CRC calculation of DCI payload, an nRNTI, a CCE index, an aggregation level, a payload size in bits, a payload, beta PDCCH (such as a power offset with respect to SSS/PBCH/PBCH DMRS of the cell), a cycle length for precoder cycling (such as in units of REG bundles), precoder indices for each of the REG bundles in a precoder cycle length, and beam index information.

The L2 may send a PDSCH command to L1 for every slot with a set of parameters and DL data for processing (encoding, etc.) before the data is sent in a transmission over the air. There may be downlink reserved resources and handling for transmission of select TBs. The PDSCH command may include information about a BWP, a TB size (such as in bytes), TB limited buffer rate matching (LBRM) information (such as a size that affects a size of a circular buffer where encoded bits are written before rate matching), a redundancy version (RV) index, a target code rate, a QAM modulation order, an indication of a downlink PDU, information about PDSCH DMRS, an indication of the location in time of the DMRS among the symbols of the PDSCH, a downlink DMRS configuration type, a downlink DMRS scrambling ID, a parameter $n_{SCID}$ used in DMRS generation, PDSCH data scrambling information (such as an nID that indicates a data scrambling identity for PDSCH or an nRNTI), PDSCH allocation information, a bitmap of RBs for PDSCH, a starting symbol for PDSCH, a symbol length for the PDSCH, a VRB to PRB mapping (such as a non-interleaved or interleaved mapping), a reference point for PDSCH DMRS, an amplitude scaling factor or power offset for PDSCH, phase tracking reference signal (PTRS) information (such as PTRS parameters for PDSCH, an indication of whether downlink PTRS is present for PDSCH, a time density for the PTRS, a frequency density for the PTRS, an RE offset for the PTRS, a PTRS scaling factor (which may be referred to as a betaPTRS), etc.), beamforming information (such as a PMI to be used for beamforming, a beam index, a PRG size, etc.)

A slot message may comprise uplink data. For example, a PUSCH message may be sent from L2 to L1 to request the L1 to process and decode an upcoming PUSCH. For example, PUSCH information that may be included in the slot message may include any of a bandwidth part for the PUSCH (such as a valid RB range and bitmap aligned to the start of the range), a scrambling ID for PUSCH data, a PUSCH mode (such as indicating whether or not DFTS is enabled and corresponding parameters), a PUSCH DMRS configuration, a PTRS configuration for PUSCH, a time and frequency allocation for PUSCH, information about UCI within PUSCH (such as when there is no data), decoding related parameters for PUSCH, bandwidth part information, location in the frequency domain (such as distance from a reference RB), bandwidth information, subcarrier spacing, cyclic prefix information, PUSCH data scrambling information (such as an nRNTI, an uplink data scrambling ID, etc.), PUSCH mode information (such as an indication of whether transform precoding is enabled, a low peak to average power ratio (PAPR) group number, a low PAPR sequence number, etc.) DMRS information (such as DMRS symbol positions, DMRS configuration type, DMRS scrambling ID, a parameter $n_{SCID}$ used in DMRS generation, a number of DMRS groups with not data, a bitmap or other indication of DMRS ports, etc.), PTRS information (such as whether uplink PTRS is present for PUSCH, RE offset information for PTRS, information about PTRS ports, an association between PTRS and DMRS ports, an uplink frequency density for PTRS, a time density for PTRS, a pre-DFT frequency density for PTRS, information about an uplink PTRS time density transform precoding, etc.), PUSCH allocation information (such as an RB bitmap of VRBs, a starting symbol for PUSCH, a symbol length for PUSCH, an indication of whether frequency hopping is enabled for PUSCH, etc.), PUSCH decoder information (such as a redundancy version (RV) index, a QAM modulation order, a code rate, a TB size, a HARQ number, an indication about retransmission, etc.), PUSCH UCI information (such as a HARQ ACK bit length, an alpha parameter for calculating a number of coded modulation symbols per layer, beta offset information for HARQ ACK, one or more beta offsets for CSI, one or more bit lengths for CSI, etc.)

The uplink information may comprise a PUSCH decode status, e.g., a message from L1 to L2 reporting the status of decoding a PUSCH (e.g., for TB and for each code block that are part of the PUSCH). Example information that may be included in the slot message regarding PUSCH includes any of an RNTI of a UE, a HARQ ID, a TB CRC status indicating pass or fail of the TB CRC, a CB CRC status indicating whether a corresponding CB has passed CRC, etc.

The uplink information may comprise a PUSCH data indication. This message from L1 to L2 may provide details of the data of a successfully decoded transport block for a given user. One transport block in UL per user (4 layers max per user). Example information that may be included in a slot message for PUSCH data indication may include any of an RNTI corresponding to the decoded data, a PDU length of the decoded data, a HARQ ID for the decoded data, data (such as a TB of actual data), etc.

Figure 7:
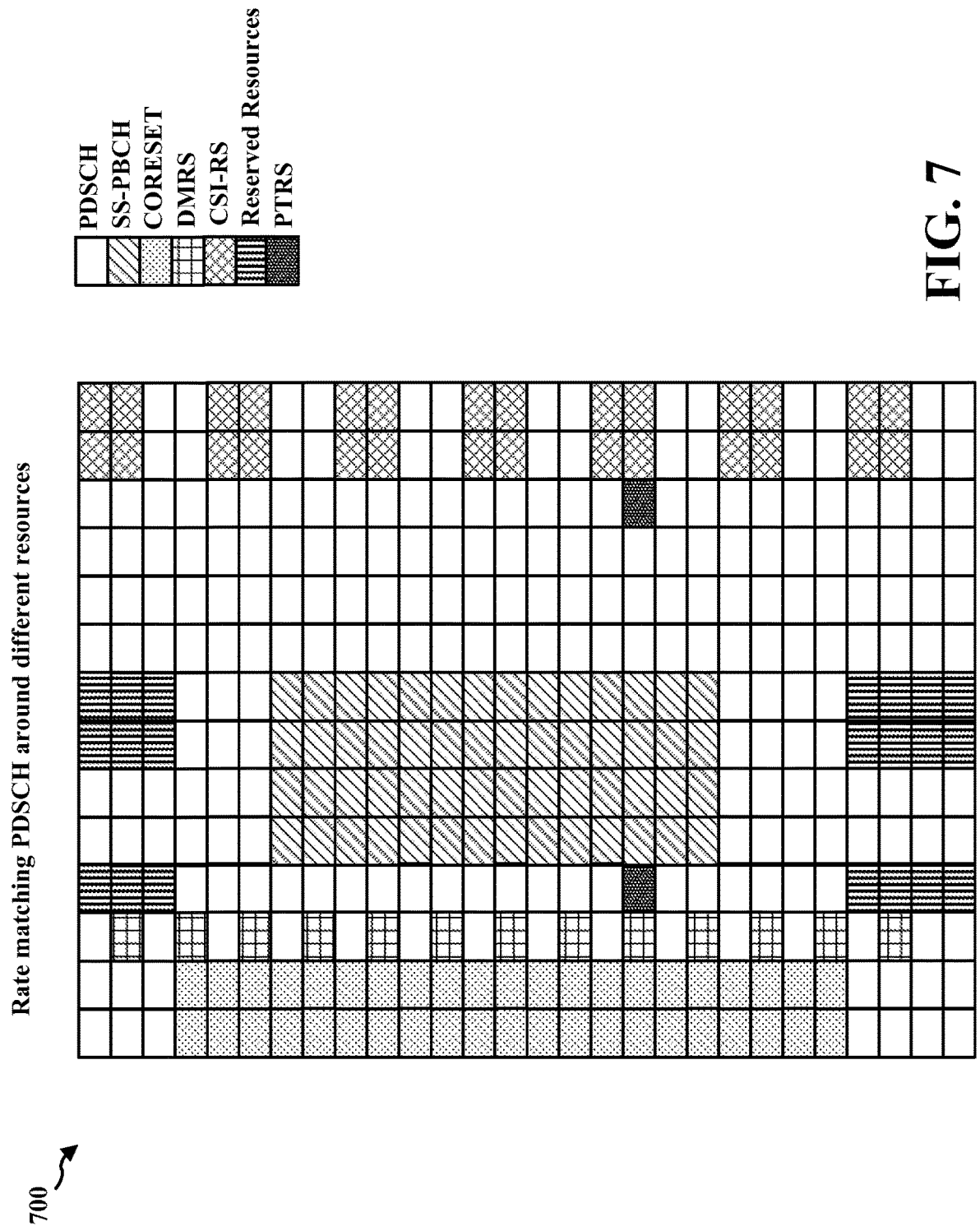
FIG. 7 illustrates an example of rate matching around resources in accordance with aspects presented herein.
Figure 8:
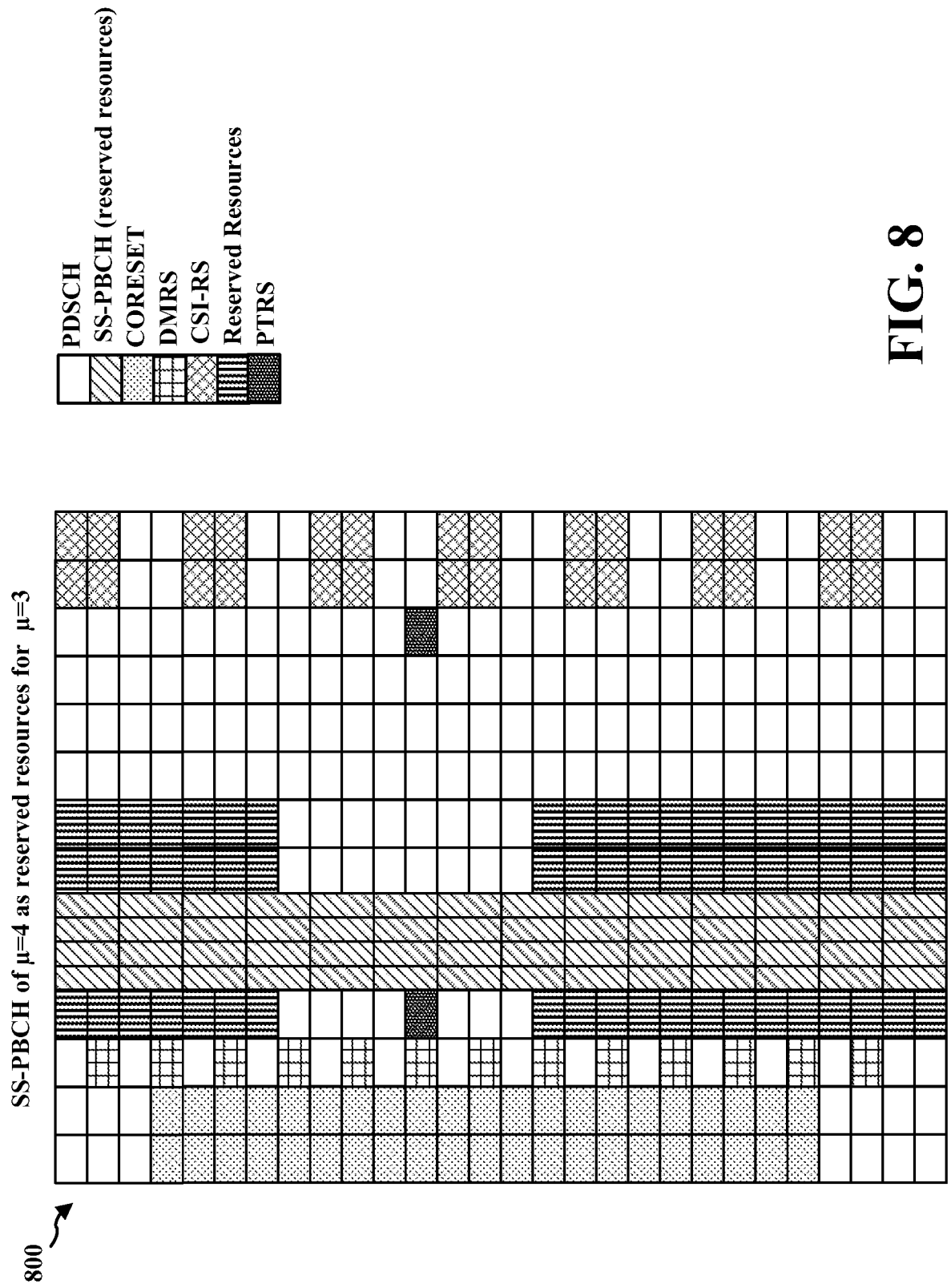
FIG. 8 illustrates an example of reserved resources in accordance with aspects presented herein.

A slot message may comprise any of tracking reference signal transmission information, sounding (e.g., CSR-RS/SRS) transmission information, sounding reception information, and/or reserved resource information. Messages related to a given numerology for a given slot may arrive at the same time in L1. For messages related to a given numerology, reserved resources may be signaled. Also, if there are resources from other numerologies overlapping with a given numerology, they may be signaled as reserved resources in the numerology under consideration. Further, SS-PBCH of some indices might not be transmitted, but the PDSCH may rate match around those resources. This can be signaled by sending the reserved resources message. Also, reserved resources may also cover LTE cell-specific reference signals to allow LTE NR co-existence. FIG. 7 illustrates an example 700 of rate matching PDSCH around different resources including rate matching around reserved resources that may be reserved for a UE. By indicating the reserved resources to the PHY layer, when the PHY transmits, the PHY layer will avoid transmitting using the reserved resources. FIG. 8 illustrates an example 800 of SS-PBCH of subcarrier spacing $\mu=4$ declared as reserved resources for a subcarrier spacing of $\mu=3$. As illustrated, the PDSCH may be rate matched around the resources that are reserved for a different subcarrier spacing. This helps to enable the use of multiple subcarrier spacings.

The API may comprise a L2 to RF component API, e.g., that communicates messages 507, 509, as illustrated in FIG. 5. The capabilities communicates from the RF component 506 to the MAC layer 502 in message 509 may comprise any of a connectivity matrix, e.g., of $B_a$; a number of TXRU ports, e.g., RF ports; physical antenna configuration(s); link budget parameter(s); beam switching rate(s); etc. The connectivity metric may be per carrier or across a band. Additionally, there may be a carrier to panel mapping.

As one example, for the L2-RF API, the MAC layer 502 may send a configuration message 513 to the RF component 506 based on the RF capabilities. As one example, the configuration may comprise analog beam information such as an analog beam table. Similar to the examples described above for slot message 515, slot message 517 may be communicated between the MAC layer 502 and the RF component 506 based on the RF capabilities received at 509. The slot message 517 may comprise information about an analog beam command. For example, analog beam command information that may be included in a slot message may include any of transceiver unit indices or RF port indices for which the beam is being changed, beam indices to be applied to the indicated transceiver units, transceiver state information (indicating whether the transceiver is off, in a transmit state or receive state), a start slot for application of the beam, a start symbol within the start slot, etc.

Figure 9:
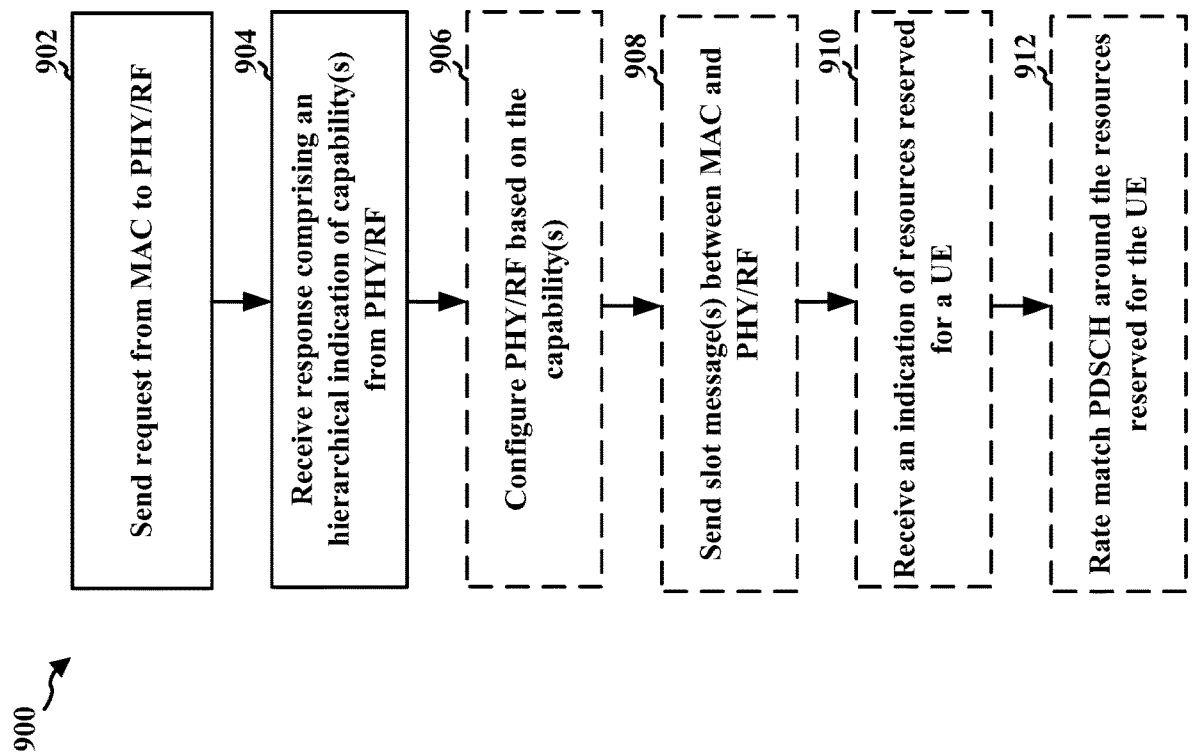
FIG. 9 is a flowchart of a method of wireless communication in accordance with aspects presented herein.

FIG. 9 is a flowchart 900 of a method of wireless communication. The method may be performed by a base station (e.g., base station 102, 180, 310 the apparatus 1002/1002'; the processing system 1114, which may include the memory 376 and which may be the entire base station 310 or a component of the base station 310, such as the TX processor 316, the RX processor 370, and/or the controller/processor 375). Optional aspects of the flowchart are illustrated with a dashed line. The method may enable a MAC layer to operate with PHY layers having various capabilities by enabling the MAC layer to learn the capabilities of the PHY layer/RF component.

At 902, a MAC layer (e.g., 502) sends a request (e.g., 503, 507) to at least one of a PHY Layer (e.g., 504) or an RF Component (e.g., 506) via an API. The request may comprise a request for capabilities from the PHY layer and/or the RF component. The request may be sent by the API component 1004 from the MAC component 1006 to the PHY component 1008 or the RF component 1010 in the example in FIG. 10.

At 904, the MAC layer receives a response message (e.g., 505, 509) from the at least one of the PHY layer or the RF component comprising an hierarchical indication of at least one capability of the PHY layer or the RF component. In the example illustrated in FIG. 10, the API component 1004 may provide the response from the PHY component 1008 or the RF component 1010 to the MAC component 1006. In one example, the response message may be received from the PHY layer and the at least one capability may comprise one or more of a PHY parameter, an RF parameter, a feature set, a feature set combination, such as described in connection with FIGS. 5 and 6. The at least one capability may be for a particular numerology.

The at least one capability may comprise an RF parameter. The RF parameter may comprise at least one of a connectivity matrix, a number of RF ports, a physical antenna configuration, a link budget parameter, or a beam switching rate. The RF parameter may be based on a hierarchy, e.g., as illustrated in FIG. 6, in which a first set of feature sets for downlink per component carrier are combined into a downlink feature set and a second set of feature sets for uplink per component carrier are combined into an uplink feature set. The downlink feature set and uplink feature set may be combined into a feature set per band. Multiple feature sets per band may be combined into a feature set combination.

At 906, the MAC layer may configure the PHY layer or the RF component based on the at least one capability received in the response message. For example, the configuration component 1012 in the apparatus 1002 may configure the PHY component 1008 or the RF component 1010 based on at least one capability received in response to the MAC component's query. For example, the PHY layer may be configured while the PHY is running. The configuration may comprises at least one of a digital beam table a cell configuration, a physical channel configuration, or an analog beam table.

As illustrated at 908, the MAC layer and the PHY layer and/or the MAC layer and the RF component may send a slot message (e.g., 515, 517) based on the at least one capability, wherein the slot message is based on one of a plurality of potential numerologies.

The slot message may indicate at least one of access information, a synchronization signal-physical broadcast channel (SS-PBCH) transmission, Physical Random Access Channel reception information, tracking reference signal transmission information, downlink data information, uplink data reception information, sounding transmission information, sounding reception information, or reserved resource information. The downlink data information may comprise at least one of downlink control transmission information, data transmission information, or uplink control reception information.

As illustrated at 910, the base station may receive an indication of resources reserved for a UE. For example, the PHY layer may receive an indication of the reserved resources. As illustrated at 912, the base station may rate match a PDSCH around the resources reserved for the UE. The rate matching may be performed, e.g., by the rate match component 1018 of the apparatus 1002 in FIG. 10. The reserved resources may be for a same subcarrier spacing as the subcarrier spacing for the PDSCH, as illustrated in the example in FIG. 7. The reserved resources may comprise a different subcarrier spacing than the PDSCH, such as illustrated in the example in FIG. 8.

Figure 10:
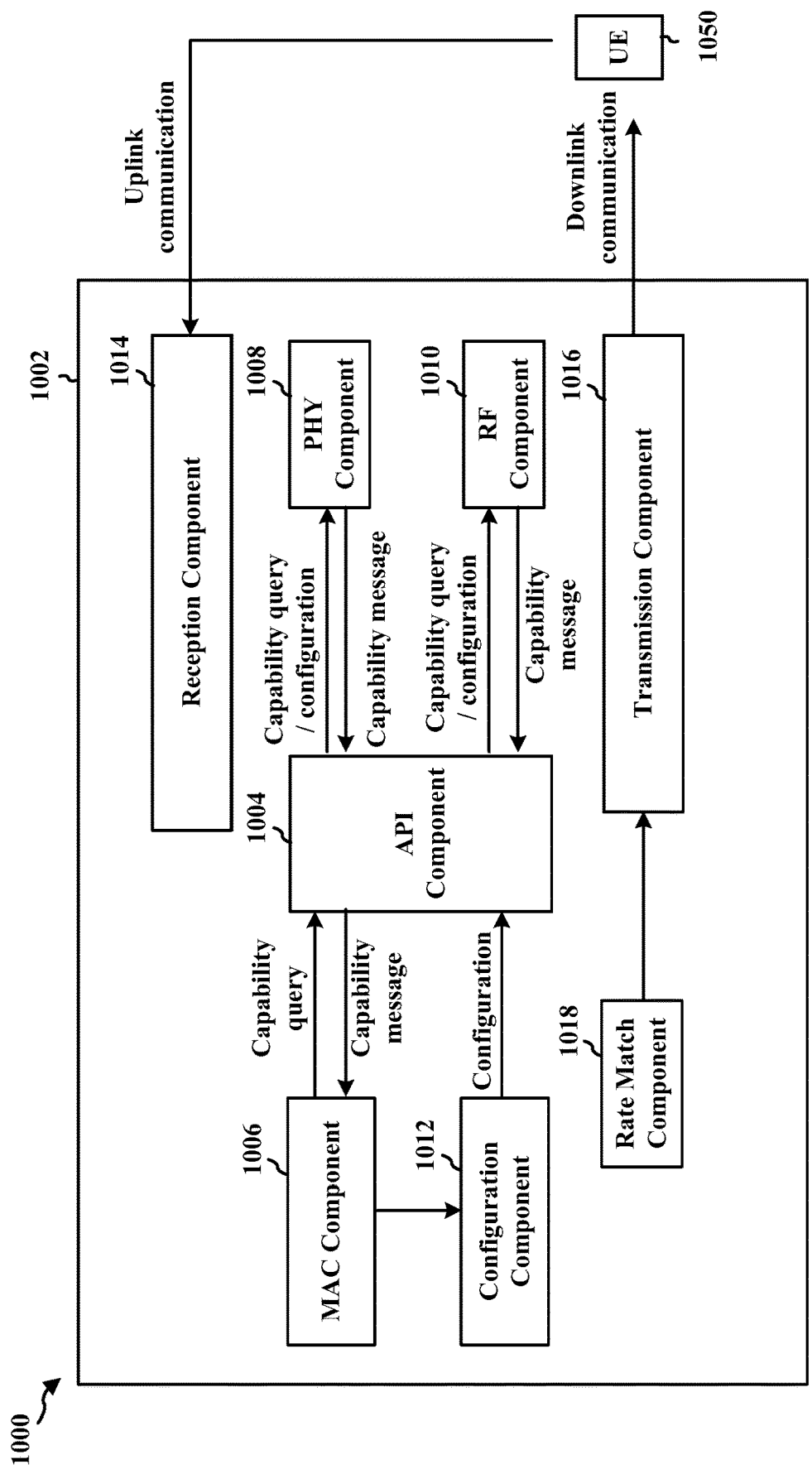
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a base station or a component of a base station. The apparatus includes an API component 1004 that sends a request from a MAC layer to at least one of a PHY layer or an RF component 1010, e.g., as described in connection with 902 in FIG. 9 or 503, 505 in FIG. 5. The API component 1004 is configured to receive a response message from the PHY layer (e.g., PHY component 1008) or the RF component 1010 indicating at least one capability of the corresponding layer. The API component 1004 may provide the response message to the MAC component 1006, e.g., as described in connection with 904 in FIG. 9 or 507, 509 in FIG. 5. The apparatus may include a configuration component 1012 that configures the PHY layer or the RF component based on the capability(s) provided in the response message to the MAC component 1006, e.g., as described in connection with 906 in FIG. 9 or 511, 513 in FIG. 5. The API component 1004 may be further configured to send a slot message between the MAC layer and the PHY layer based on the capability(s), the slot message being based on one of a plurality of potential numerologies, e.g., as described in connection with 908 in FIG. 9 or 515, 517 of FIG. 5. The apparatus may include a reception component 1014 that is configured to receive uplink communication from a UE 1050 and a transmission component 1016 that is configured to transmit downlink communication to the UE 1050. The apparatus may include a rate match component 1018 that is configured to receive an indication of resources reserved for a UE and to rate match PDSCH around the resources reserved for the UE, e.g., as described in connection with FIG. 7 or 8.

The apparatus may include additional components that perform each of the blocks of the algorithm in the aforementioned flowcharts of FIG. 5 or 9. As such, each block in the aforementioned flowcharts of FIG. 5 or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
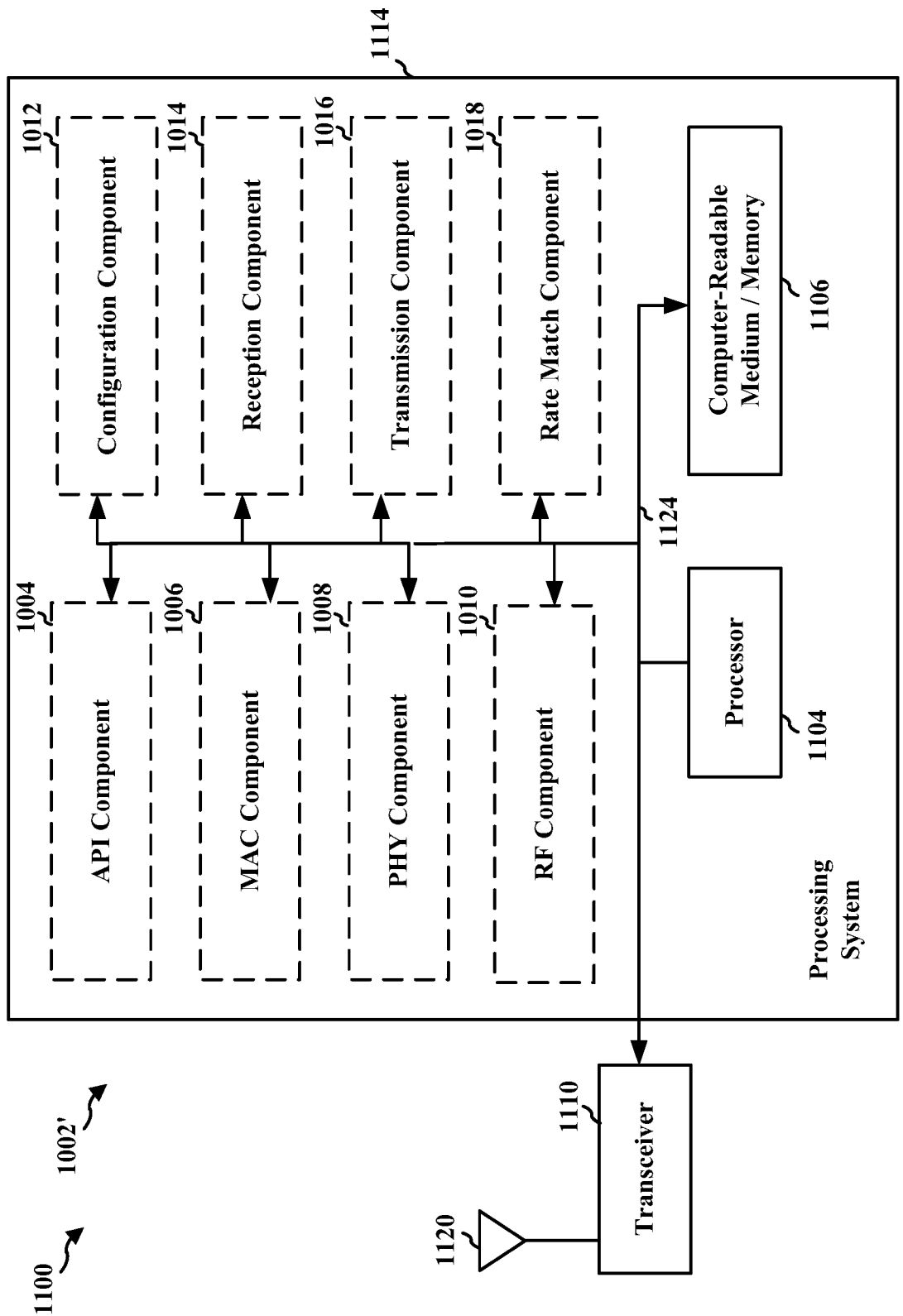
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1014. In addition, the transceiver 1110 receives information from the processing system 1114, specifically the transmission component 1016, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for sending a request from a MAC layer to at least one of a PHY Layer or a RF Component using an API and means for receiving a response message from the at least one of the PHY layer or the RF component indicating at least one capability of the PHY layer or the RF component using the API. The apparatus may include means for configuring the PHY layer or the RF component based on the at least one capability received in the response message. The apparatus may include means for sending a slot message between the MAC layer and the PHY layer based on the at least one capability, wherein the slot message is based on one of a plurality of potential numerologies. The apparatus may include means for receiving an indication of resources reserved for a UE and means for rate matching a PDSCH around the resources reserved for the UE. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a network node comprising a Medium Access Control (MAC) layer and at least one of a Physical (PHY) layer or a Radio Frequency (RF) component, the method comprising:
sending a capability request from the MAC layer of the network node to the at least one the PHY layer or the RF component of the network node using an application protocol interface (API);
receiving, at the MAC layer of the network node via the API and in response to the capability request from the MAC layer, a capability response message from the at least one of the PHY layer or the RF component of the network node, the capability response message comprising a hierarchical indication informing the MAC layer of the network node via the API of capabilities supported by the PHY layer or the RF component of the network node at different respective levels of a hierarchy, the hierarchical indication indicating:
a first feature set of one or more capabilities supported by the PHY layer or the RF component of the network node, the first feature set being provided at a first level of the hierarchy, and
a second feature set of one or more capabilities supported by the PHY layer or the RF component of the network node, the second feature set being provided at a second level of the hierarchy, with multiple different first feature sets of one or more capabilities supported by the PHY layer or the RF component provided at the first level of the hierarchy being combined into the second feature set of one or more capabilities that is indicated as being supported by the PHY layer or the RF component of the network node at the second level of the hierarchy; and operating, at the MAC layer of the network node, with the at least one of the PHY layer or the RF component based on the hierarchical indication of the capabilities to communicate with one or more user equipment (UEs), wherein the first level of the hierarchy is based on a per component carrier (CC) level, a per downlink or uplink direction level, or a per frequency band level, and wherein the second level of the hierarchy is based on the per downlink or uplink direction level, the per frequency band level, or a feature set combination per band level.

2. The method of claim 1, wherein the capabilities comprise an RF parameter.

3. The method of claim 2, wherein the RF parameter comprises at least one of a connectivity matrix, a number of RF ports, a physical antenna configuration, a link budget parameter, or a beam switching rate.

4. The method of claim 2, wherein the RF parameter is based on the hierarchy in which a first set of feature sets for downlink per component carrier are combined into a downlink feature set and a second set of feature sets for uplink per component carrier are combined into an uplink feature set.

5. The method of claim 4, wherein the downlink feature set and the uplink feature set are combined into a feature set per band.

6. The method of claim 5, wherein multiple feature sets per band are combined into the feature set combination.

7. The method of claim 1, further comprising:
configuring the PHY layer or the RF component based on the capabilities received in the capability response message.

8. The method of claim 7, wherein the PHY layer is configured while the PHY layer is running.

9. The method of claim 7, wherein the PHY layer or the RF component is configured with at least one of a digital beam table, a cell configuration, a physical channel configuration, or an analog beam table.

10. The method of claim 1, wherein the capability response message is received from the PHY layer and wherein each of the capabilities comprise one or more of a PHY parameter, an RF parameter, a feature set, or the feature set combination.

11. The method of claim 1, wherein one or more of the capabilities are associated with a particular numerology.

12. The method of claim 1, further comprising:
sending a slot message between the MAC layer and the PHY layer based on the capabilities, wherein the slot message is based on one of a plurality of potential numerologies.

13. The method of claim 12, wherein the slot message indicates at least one of access information, a synchronization signal-physical broadcast channel (SS-PBCH) transmission, Physical Random Access Channel reception information, tracking reference signal transmission information, downlink data information, uplink data reception information, sounding transmission information, sounding reception information, or reserved resource information, wherein the downlink data information comprises at least one of downlink control transmission information, data transmission information, or uplink control reception information.

14. The method of claim 1, further comprising:
receiving an indication of resources reserved for a user equipment (UE) from one of the UEs; and
rate matching a physical downlink shared channel (PDSCH) around the resources reserved for the UE.

15. The method of claim 14, wherein the resources reserved for the UE comprise a different subcarrier spacing than the PDSCH.

16. An apparatus for wireless communication at a network node comprising a Medium Access Control (MAC) layer and at least one of a Physical (PHY) layer or a Radio Frequency (RF) component, comprising:
a memory; and
at least one processor coupled to the memory and configured to:
send a capability request from the MAC layer of the network node to the at least one of the PHY layer or the RF component of the network node using an application protocol interface (API);
receive, at the MAC layer of the network node via the API and in response to the capability request from the MAC layer, a capability response message from the at least one of the PHY layer or the RF component of the network node, the capability response message comprising a hierarchical indication informing the MAC layer via the API of capabilities supported by the PHY layer or the RF component of the network node at different respective levels of a hierarchy, the hierarchical indication indicating:
a first feature set of one or more capabilities supported by the PHY layer or the RF component of the network node, the first feature set being provided at a first level of the hierarchy, and
a second feature set of one or more capabilities supported by the PHY layer or the RF component of the network node, the second feature set being provided at a second level of the hierarchy, with multiple different first feature sets of one or more capabilities supported by the PHY layer or the RF component provided at the first level of the hierarchy being combined into the second feature set of one or more capabilities that is indicated as being supported by the PHY layer or the RF component of the network node at the second level of the hierarchy; and
operate, at the MAC layer of the network node, with the at least one of the PHY layer or the RF component based on the hierarchical indication of the capabilities to communicate with one or more user equipment (UEs),
wherein the first level of the hierarchy is based on a per component carrier (CC) level, a per downlink or uplink direction level, or a per frequency band level, and wherein the second level of the hierarchy is based on the per downlink or uplink direction level, the per frequency band level, or a feature set combination per band level.

17. The apparatus of claim 16, wherein the capabilities comprise an RF parameter comprising at least one of a connectivity matrix, a number of RF ports, a physical antenna configuration, a link budget parameter, or a beam switching rate.

18. The apparatus of claim 17, wherein the RF parameter is based on the hierarchy in which a first set of feature sets for downlink per component carrier are combined into a downlink feature set and a second set of feature sets for uplink per component carrier are combined into an uplink feature set.

19. The apparatus of claim 18, wherein the downlink feature set and the uplink feature set are combined into a feature set per band, and wherein multiple feature sets per band are combined into the feature set combination.

20. The apparatus of claim 16, wherein the at least one processor is further configured to:
configure the PHY layer or the RF component based on the capabilities received in the capability response message.

21. The apparatus of claim 20, wherein the at least one processor is configured to configure the PHY layer while the PHY layer is running.

22. The apparatus of claim 16, wherein the at least one processor is configured to receive the capability response message from the PHY layer, and wherein each of the capabilities comprise one or more of a PHY parameter, an RF parameter, a feature set, or the feature set combination.

23. The apparatus of claim 16, wherein one or more of the capabilities are associated with a particular numerology.

24. The apparatus of claim 16, wherein the at least one processor is further configured to:
send a slot message between the MAC layer and the PHY layer based on the capabilities, wherein the slot message is based on one of a plurality of potential numerologies.

25. The apparatus of claim 24, wherein the slot message indicates at least one of access information, a synchronization signal-physical broadcast channel (SS-PBCH) transmission, Physical Random Access Channel reception information, tracking reference signal transmission information, downlink data information, uplink data reception information, sounding transmission information, sounding reception information, or reserved resource information,
wherein the downlink data information comprises at least one of downlink control transmission information, data transmission information, or uplink control reception information.

26. The apparatus of claim 16, wherein the at least one processor is further configured to:
receive an indication of resources reserved for one of the UEs; and
rate match a physical downlink shared channel (PDSCH) around the resources reserved for the UE.

27. The apparatus of claim 26, wherein the resources reserved for the UE comprise a different subcarrier spacing than the PDSCH.

28. An apparatus for wireless communication at a network node comprising a Medium Access Control (MAC) layer and at least one of a Physical (PHY) layer or a Radio Frequency (RF) component, comprising:
means for sending a capability request from the MAC layer of the network node to the at least one the PHY layer or the RF component of the network node using an application protocol interface (API);
means for receiving, at the MAC layer of the network node via the API and in response to the capability request from the MAC layer, a capability response message from the at least one of the PHY layer or the RF component of the network node, the capability response message comprising a hierarchical indication informing the MAC layer of the network node via the API of capabilities supported by the PHY layer or the RF component of the network node at different respective levels of a hierarchy, the hierarchical indication indicating:
a first feature set of one or more capabilities supported by the PHY layer or the RF component of the network node, the first feature set being provided at a first level of the hierarchy, and
a second feature set of one or more capabilities supported by the PHY layer or the RF component of the network node, the second feature set being provided at a second level of the hierarchy, with multiple different first feature sets of one or more capabilities supported by the PHY layer or the RF component provided at the first level of the hierarchy being combined into the second feature set of one or more capabilities that is indicated as being supported by the PHY layer or the RF component of the network node at the second level of the hierarchy; and
means for operating, at the MAC layer of the network node, with the at least one of the PHY layer or the RF component based on the hierarchical indication of the capabilities to communicate with one or more user equipment (UEs),
wherein the first level of the hierarchy is based on a per component carrier (CC) level, a per downlink or uplink direction level, or a per frequency band level, and wherein the second level of the hierarchy is based on the per downlink or uplink direction level, the per frequency band level, or a feature set combination per band level.

29. The apparatus of claim 28, wherein the capabilities comprise an RF parameter based on the hierarchy in which a first set of feature sets for downlink per component carrier are combined into a downlink feature set and a second set of feature sets for uplink per component carrier are combined into an uplink feature set.

30. A non-transitory computer-readable medium storing computer executable code for wireless communication at a network node comprising a Medium Access Control (MAC) layer and at least one of a Physical (PHY) layer or a Radio Frequency (RF) component, the code when executed by a processor cause the processor to:
send a capability request from the MAC layer of the network node to the at least one the PHY layer or the RF component of the network node using an application protocol interface (API);
receive, at the MAC layer of the network node via the API and in response to the capability request from the MAC layer, a capability response message from the at least one of the PHY layer or the RF component of the network node, the capability response message comprising a hierarchical indication informing the MAC layer of the network node via the API of capabilities supported by the PHY layer or the RF component of the network node at different respective levels of a hierarchy, the hierarchical indication indicating:
a first feature set of one or more capabilities supported by the PHY layer or the RF component of the network node, the first feature set being provided at a first level of the hierarchy, and
a second feature set of one or more capabilities supported by the PHY layer or the RF component of the network node, the second feature set being provided at a second level of the hierarchy, with multiple different first feature sets of one or more capabilities supported by the PHY layer or the RF component provided at the first level of the hierarchy being combined into the second feature set of one or more capabilities that is indicated as being supported by the PHY layer or the RF component of the network node at the second level of the hierarchy; and operate, at the MAC layer of the network node, with the at least one of the PHY layer or the RF component based on the hierarchical indication of the capabilities to communicate with one or more user equipment (UEs), wherein the first level of the hierarchy is based on a per component carrier (CC) level, a per downlink or uplink direction level, or a per frequency band level, and wherein the second level of the hierarchy is based on the per downlink or uplink direction level, the per frequency band level, or a feature set combination per band level.

\* \* \* \* \*